July 14, 1931.  G. R. METCALF, JR., ET AL  1,814,480
CONDUIT FITTING
Filed Sept. 8, 1927
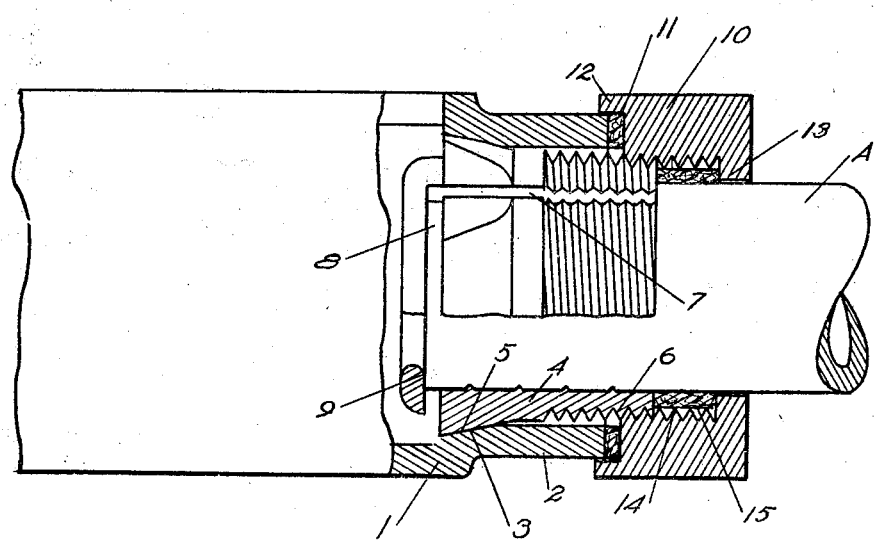

Patented July 14, 1931

1,814,480

UNITED STATES PATENT OFFICE

GEORGE RALPH METCALF, JR., AND FRANK JAMES RAYBOULD, OF ERIE, PENNSYLVANIA, ASSIGNORS TO ERIE MALLEABLE IRON COMPANY, OF ERIE, PENNSYLVANIA, A CORPORATION OF PENNSYLVANIA

CONDUIT FITTING

Application filed September 8, 1927. Serial No. 218,326.

In forming conduit fittings, particularly those operating in relation to threadless conduits, structures have been made involving contractible sleeves which are contracted into clamping engagement with the conduit through an endwise movement of the sleeve. With such structures efforts have been made to render them water-tight by packing the fitting, utilizing the nut which operates on the sleeve to draw it into clamping relation. The variations incident to the sizes of conduit and the range of movement necessary to clamp the sleeve have rendered such structures more or less inefficient because heretofore a packing of practically incompressible material has been used in these structures. According to the present invention the gland is elongated so as to allow a considerable axial length of packing and an actually compressible packing is used so that even with a large variation the gland is filled with packing under compression and thus a water tight joint maintained. Features and details of the invention will appear from the specification and claims.

A preferred exemplification of the invention is illustrated in the accompanying drawing which shows a conduit fitting in the form of a conduit box, partly in section.

1 marks the fitting body. This is provided with an extension 2 having a tapered opening 3.

A contractible sleeve 4 is arranged in the extension. This has a tapered inner end 5 and a screw-threaded outer end 6. It also has a longitudinal slot 7 terminating in a circumferentially extending slot 8 just inside a guard shoulder 9.

A nut 10 is screwed on the outer end of the sleeve and draws the sleeve endwise to contract the same into clamping engagement with a conduit A. A gasket 11 is arranged between the end of the fitting and the nut and tends to render this joint water-tight. Preferably the nut has an extending flange 12 which forms a gland in which the gasket is placed.

The outer end of the nut is provided with an internally extending flange 13 forming a gland 14 in which is placed a packing material 15. The gland is of greater length than width and the packing material is actually compressible so that as the nut is screwed up to draw the sleeve endwise into clamping engagement with a conduit the packing permits of a variation in the endwise movement of the nut on the sleeve to compensate for variations in sizes of conduit and such variations as may occur in the fitting. This variation in the packing also compensates for variations in the gaskets under pressure.

While we have illustrated our invention as particularly adapted for electric conduits we wish to be understood that the conduit is not limited to this particular application in its use.

What we claim as new is:—

1. In a conduit fitting, the combination of a body having a conduit-receiving opening and a slotted contractible sleeve in the opening screw-threaded at its outer end, the walls of the opening in the sleeve having wedging surfaces brought into engagement by the outer axial movement of the sleeve; a nut on the sleeve operating on the body to draw the sleeve endwise, said nut having a gland at the end of the sleeve surrounding the conduit with the end of the sleeve forming one wall of the gland, the gland having greater axial length than width; and a packing in the gland formed of material compressible with relation to its volume whereby the variation in the endwise movement of the sleeve to compensate for variations of conduit and fitting is accommodated by the packing.

2. In a conduit fitting, the combination of a body having a conduit-receiving opening and a slotted contractible sleeve in the opening screw-threaded at its outer end, the walls of the opening in the sleeve having wedging surfaces brought into engagement by the outer axial movement of the sleeve; a nut on the sleeve operating on the body to draw the sleeve endwise, said nut having a gland at the end of the sleeve surrounding the conduit with the end of the sleeve forming one wall of the gland, the gland having greater axial length than width; a gasket surrounding the sleeve arranged between the nut and the body; and a packing in the gland formed of material compressible with relation to its volume whereby the variation in the endwise movement of the sleeve to compensate for variations of conduit and fitting is accommodated by the packing.

3. In a conduit fitting, the combination of a body having a conduit-receiving opening; a contractible sleeve in the opening, the walls of the opening in the sleeve having wedging surfaces brought into engagement by an axial movement of the sleeve; means exerting endwise pressure on the sleeve; a gland at one end of the sleeve surrounding the conduit, the end of the sleeve extending into and forming one compressing wall of the gland, the gland having greater axial length than width; and a packing in the gland formed of material compressible with relation to its volume whereby variations in the endwise movement of the sleeve to compensate for variations in conduit and fitting are accommodated by the packing.

In testimony whereof we have hereunto set our hands.

GEORGE RALPH METCALF, Jr.
FRANK JAMES RAYBOULD.